June 25, 1940.   K. VOLKMANN   2,205,548
LIQUID FILLED COMPASS
Filed May 24, 1938   3 Sheets-Sheet 1

INVENTOR.
Kurt Volkmann
BY
Stephen Cerstvik
ATTORNEY.

June 25, 1940.　　　　K. VOLKMANN　　　　2,205,548
LIQUID FILLED COMPASS
Filed May 24, 1938　　　　3 Sheets-Sheet 2

INVENTOR.
Kurt Volkmann
BY Stephen Cerstvik
ATTORNEY.

June 25, 1940.                K. VOLKMANN                2,205,548
                            LIQUID FILLED COMPASS
                            Filed May 24, 1938            3 Sheets-Sheet 3
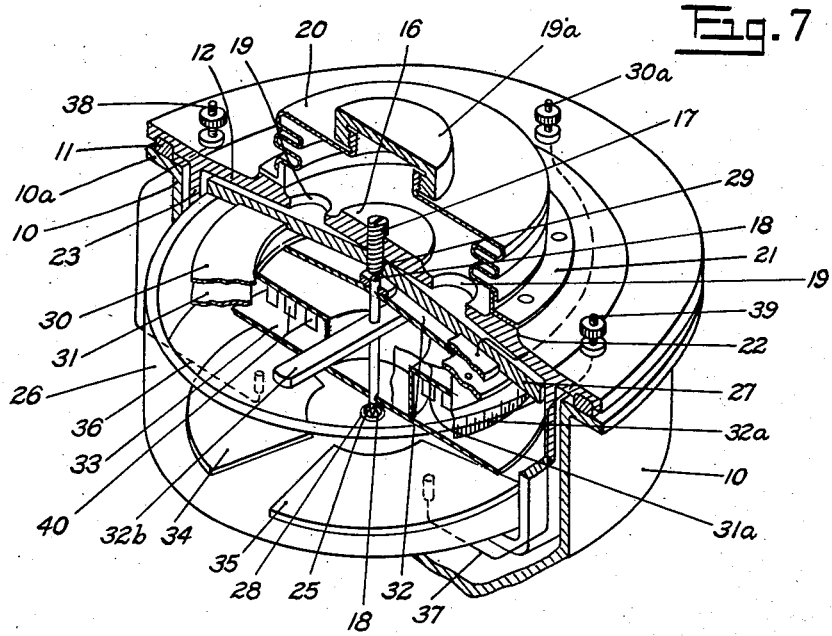
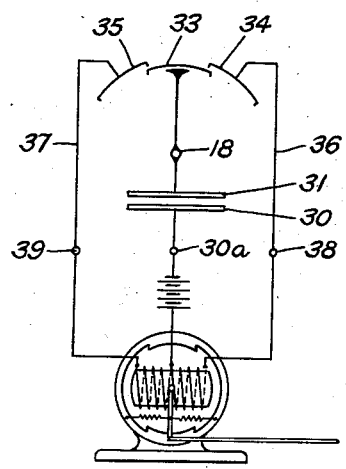
INVENTOR.
Kurt Volkmann
BY Stephen Cerstvik
ATTORNEY.

Patented June 25, 1940

2,205,548

UNITED STATES PATENT OFFICE 2,205,548

LIQUID FILLED COMPASS

Kurt Volkmann, Berlin-Charlottenburg, Germany, assignor to Siemens Apparate und Maschinen Gesellschaft mit beschränkter Haftung, Berlin, Germany, a corporation of Germany Application May 24, 1938, Serial No. 209,833
In Germany May 29, 1937

3 Claims. (Cl. 33—223)

This invention relates to direction indicating means and more particularly to a magnetic compass for vehicles.

One of the objects of the present invention is to provide a novel compass, the basin of which is filled with a liquid, wherein the movement of the liquid relative to the compass is reduced to a minimum.

Another object of the invention is to provide a novel apparatus of the above character wherein the members of a compass mounting are constructed to reduce the agitating effect upon a liquid contained therein.

A further object is to provide a novel liquid filled compass employing electrodes, wherein a vessel comprising a surface of revolution serves as a support for the electrodes, the vessel having an external supporting frame attached to an outer container.

An additional object is to provide novel damping means for an indicating element of a compass.

Another object is to provide a novel compass, the basin of which contains a liquid, wherein the movement of the liquid relative to the compass mounting is reduced to a minimum and wherein projecting vanes mounted upon a direction indicating element of said compass damp the movements of the element.

A further object is to provide novel means of the above character wherein the lag in the motion of the magnetic element due to agitation of a surrounding liquid is reduced to a maximum.

An additional object is to provide a novel electrolytic compass wherein compensation is made for the expansion and contraction of the electrolyte.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Fig. 1 is a side elevation, partly in section, of one embodiment of the invention;

Fig. 7 is a perspective view illustrating the respective positions of the elements; and Fig. 8 is a diagrammatic illustration of the application of the compass control to a controlling element.

The form of the invention illustrated in the accompanying drawings, by way of example, is a magnetic compass mounted in a cylindrical liquid-filled transparent basin. The basin is provided with a removable cover portion having centrally disposed thereon, an expansible and contractible corrugated metal vessel which is in communication with the basin and adapted to compensate for the changes in volume of the liquid enclosed in said basin, said changes in volume being due to temperature variations. A U-shaped frame portion is suspended from said cover to receive and hold a transparent cylindrical vessel having a smooth inner surface, embedded in which are suitable electrodes for cooperation with electrodes mounted upon a magnetic compass float member which in turn is pivotally mounted by means of a vertical shaft on bearings in said cover and frame portion. A flange upon the periphery of said rose is calibrated for course readings whereby the compass may be read from the side of the above-mentioned transparent basin. Suitable vanes which, in the form shown, depend vertically from said float and extend into said liquid are provided for damping the movements of the float.

Figure 1:
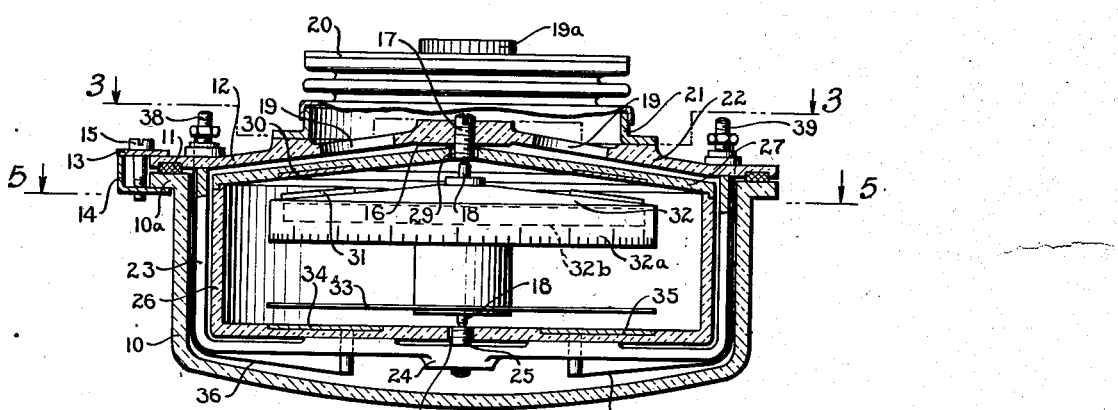

In the form shown in Fig. 1, a transparent container or basin 10 of glass, for example, is provided having an annular lip 10a around the upper edge thereof. Upon lip 10a is a ring packing 11 upon which rests a cover portion 12 for said basin. Suitable means comprising a ring 13, engaging the outer edge of the cover 12, and a cooperating flange portion 14 which engages lip 10a, are drawn together by screws 15, thereby compressing the packing 11 between said cover and basin and forming a liquid-tight joint.

Centrally disposed upon cover 12 is a boss 16 in which is a longitudinally adjustable screw 17, the inner end of which is conically recessed to form a bearing for a compass shaft 18 for a purpose to be later explained. Adjacent said boss and angularly arranged at desired intervals are openings 19 which put the basin 10 in communication with a bellows or corrugated expansible and contractible metal vessel 20 attached to cover 12 by means of an annular flange member 21 which rests upon a raised lip portion 22 upon said cover. Vessel 20 is provided at the top thereof with a removable closure 19a through which the compass may be filled with a suitable electrolyte for a purpose to appear later.

In order that a second bearing may be properly held for said compass shaft, a U-shaped frame member 23 is provided having the upper extremities of the parallel arms thereof extending through cover 12 and held in a fixed position by suitable nuts (not shown) engaging threads upon said extremities. A boss 24 centrally disposed at the lower portion of said frame member supports in a suitable threaded bore a bearing screw 25 similar to screw 17.

Frame 23 also serves to support a transparent cylindrical vessel 26 upon the inner surface of which are mounted electrodes to be later described. The walls of vessel 26 comprise a surface of revolution and both the inner and outer surfaces of said vessel are free from projections which might entrain and agitate the liquid in the compass basin. The vessel 26 and a cover 27 are provided with central bores 28 and 29, respectively, through which loosely extend the screws 25 and 17. The bores 28 and 29 also constitute passages for the electrolyte. Since frame member 23 is external to the vessel 26, movements of the frame member will agitate only the electrolyte also external to said vessel.

In order that bubbles formed in the electrolyte in vessel 26 may collect and easily escape through the bore 29 in the center of cover 27, said cover is formed in the shape of a cone of low altitude, thus constituting the cover a gas mantle for the vessel.

The system of electrodes for determining the position of the magnetic direction indicator as best shown in Figs. 1 and 7 is constituted by an electrode 30 in the form of a ring imbedded in and flush with the inner surface of cover 27. The current transmission occurs through the electrolyte from said electrode to an adjacent intermediate ring-shaped electrode 31 similar thereto and mounted upon a conventional direction indicating element or compass float 32 which, in turn, is rigidly attached to the above-mentioned vertical compass shaft 18. Float 32 comprises a surface of revolution and is provided with a peripheral flange 32a which encloses a magnetic rod 32b, the flange being calibrated in degrees from which course indications may be determined when read against a suitable reference mark (not shown). The intermediate electrode is connected by a lead 31a to a semicircular control electrode 33 mounted upon the lower portion of shaft 18 and adapted for rotation therewith. The latter electrode, in turn, moves in rotation adjacent to and above a pair of opposed electrodes 34 and 35 which are imbedded in and flush with the inner surface of the bottom of vessel 26. The electrodes 34 and 35 are connected by leads 36, 37, respectively, to suitable external binding posts 38, 39 mounted upon the outer cover 12, while electrode 30 is connected to binding post 30a.

In operation of this embodiment, turning movements the vehicle upon which the apparatus is mounted will cause the basin 10, frame 23, and vessel 26 to move therewith relative to the magnetic indicator 32. The conformation of the inner surface of vessel 26 reduces the possibility of agitating the electrolyte therein whereby the liquid remains relatively quiet.

In Fig. 8 there are diagrammatically illustrated the various electrical connections to the electrodes and the operation of the circuit upon relative movement of the directional element, whereby the movement of the directional element is conveyed to a remote controlling device. One side of a source of electrical energy is connected to the binding post 30a which post is electrically connected to the stationary electrode 30. Electrode 30 is mounted on the top cover 27 and is at all times directly above the cooperating movable electrode 31 mounted on directional element 32. The electrolyte between electrodes 30 and 31 conveys the electrical energy between these electrodes and this energy is further conveyed by the conductor 31a (see Fig. 7) to the semicircular electrode 33 mounted on the directional element 32 and cooperating with electrodes 34 and 35. Electrical energy is conveyed between electrodes 33 and the cooperating electrodes 34 and 35 by means of the electrolyte therebetween, the amount of energy conveyed to the respective electrodes 34 and 35 being determined by the relative position of the control electrode 33 with respect to electrodes 34 and 35, respectively. Since the position of electrode 33 is determined by that of the directional element, the electrical energy is conveyed to the binding post 38 and 39 and from these to the windings of a conventional rotary magnet whose armature controls a servomotor in the manner well known in the art whereby a control surface of the craft may be actuated in response to relative deviation of the craft and the directional element.

Figure 2:
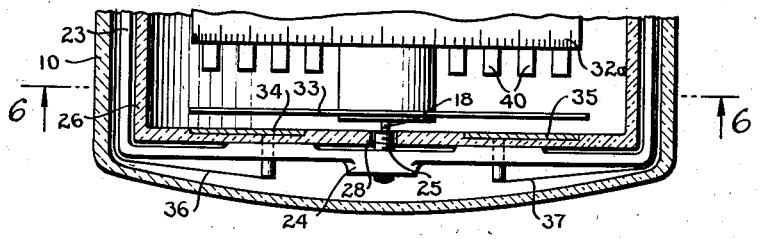
Fig. 2 is a side elevation, partly in section and with parts broken away, showing a second embodiment of the present invention.
Figure 3:
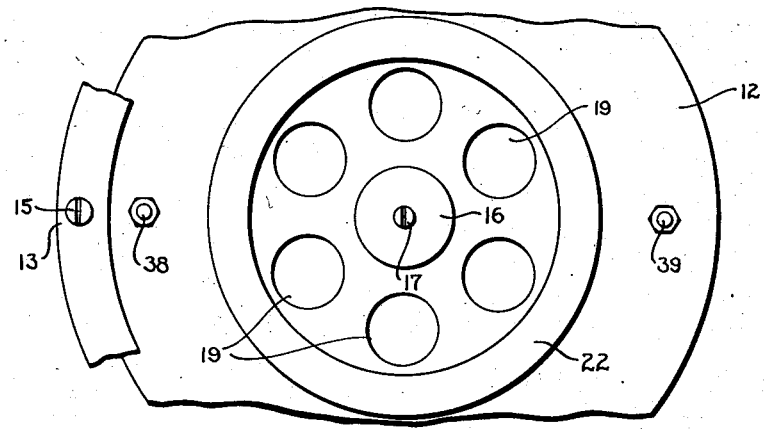
Fig. 3 is a section of the embodiment shown in Fig. 1 taken along line 3—3 with parts broken away.
Figure 4:
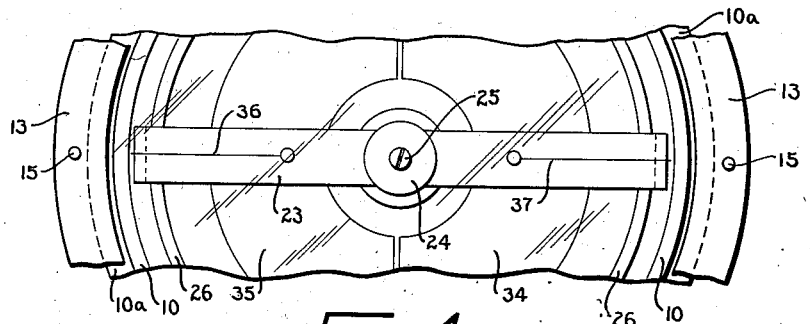
Fig. 4 is a bottom view with parts broken away of the embodiment shown in Fig. 1.
Figure 5:
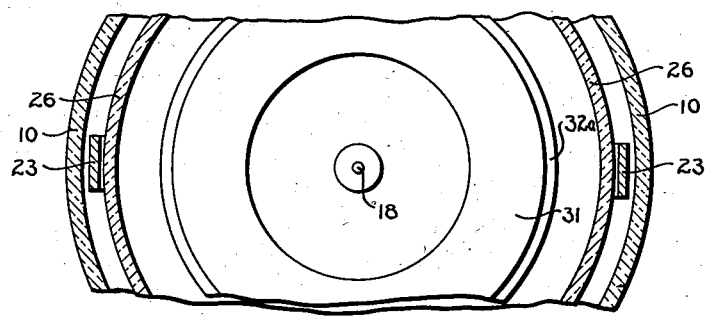
Fig. 5 is a section of the embodiment shown in Fig. 1 taken along line 5—5 with parts broken away.
Figure 6:
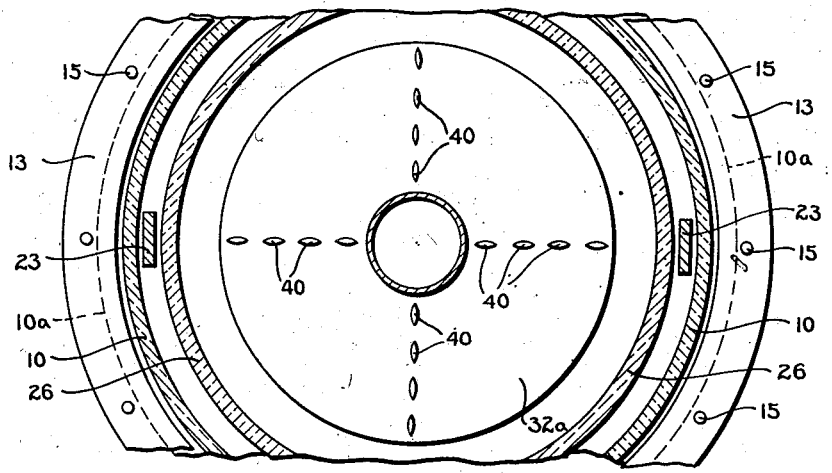
Fig. 6 is a section of the embodiment of Fig. 2, taken along line 6—6, with parts broken away.

The liquid in the above-described vessel 26 will remain relatively quiet and will not appreciably affect the movements of the float 32. In order to damp any movements of the float, there are provided, in the second embodiment shown in Fig. 2, a series of vanes 40 which depend vertically from the float. With the exception of vanes 40, the second embodiment is similar to the first embodiment. These damping bodies or vanes are constituted by narrow stream-lined strips which are preferably disposed transversely to their path of movement, i. e., such that the wide face of the strip will be presented to the liquid if the float should move in azimuth. The vanes are symmetrically arranged upon diameters of the float and do not extend beyond the outer circumference thereof.

The operation of the second embodiment is similar to that of the first with the addition that any angular motion which may be imparted to the float 32 by said turning movements will be immediately damped by the vanes 40 acting upon the electrolyte.

There is thus provided a novel mounting for a compass employing liquid within the basin thereof. The device provides means for mounting suitable electrodes and a compass float which means are so constructed and arranged that the liquid in which they are immersed is agitated as little as possible due to movements of said means. Means are also provided which immediately damp any movements of the compass float relative to the liquid. Thus, inaccuracies in compass readings due to an agitated electrolyte or liquid are reduced to a minimum.

Although only one embodiment of the invention has been illustrated and described in detail, it is to be expressly understood that the same is not limited thereto. For example, in the form shown, a U-shaped frame member is employed for mounting a compass bearing and receiving the electrode housing. However, this frame member may be of any suitable shape. Various changes may also be made in the design and arrangement of the parts without departing from the spirit and scope of the invention, as the same will now be understood by those skilled in the art. For a definition of the limits of the invention, reference will be had primarily to the appended claims.

What is claimed is:

1. In a compass having a basin containing an electrolyte, a vessel including a surface of revolution within said basin, a direction indicating element pivoted within said vessel for rotation about a vertical axis passing centrally through said basin, a pair of adjacent circular electrodes respectively mounted upon said vessel and said element and the peripheries of said electrodes positioned equally distant about said axis, a second electrode mounted on said element, a pair of insulated electrodes mounted on said vessel and positioned in a horizontal plane parallel and adjacent to the plane of said second electrode, and means for electrically connecting the electrodes on said element whereby the current flowing to said pair of insulated electrodes is a function of the angular relation of said vessel and said element.

2. In a compass having a basin containing an electrolyte, a vessel including a surface of revolution within said basin, a direction indicating element pivoted within said vessel for rotation about a vertical axis passing centrally through said basin, a circular electrode mounted upon said vessel, a second circular electrode mounted upon said element adjacent said first-named circular electrode, the peripheries of said first-named and said second circular electrodes positioned equally distant about said axis, means for supplying electrical energy to said first-named circular electrode, a second electrode positioned on said element and disposed concentrically with respect to said axis, a pair of insulated electrodes mounted upon said vessel in a horizontal plane with respect to said axis and positioned parallel and adjacent to the plane of said second electrode, and means for electrically connecting the electrodes on said element whereby the current flowing to said pair of insulated electrodes is a function of the angular relation of said vessel and said element.

3. In a compass having a transparent basin containing an electrolyte, a transparent vessel constructed to form a surface of revolution within said basin, means allowing liquid communication between said basin and said vessel, a direction indicating element pivoted within said vessel for rotation about a vertical axis passing centrally through said basin, a circular electrode mounted in the upper wall of said vessel, a second circular electrode mounted upon said element adjacent said first-named circular electrode, the peripheries of said first-named and said second circular electrodes positioned equally distant about said axis, a pair of insulated electrodes mounted in the lower wall of said vessel, a second electrode mounted on said element and disposed concentrically with respect to said axis in a horizontal plane parallel and adjacent to the plane of said insulated electrodes, and means for electrically connecting the electrodes on said element whereby the current flowing to said pair of insulated electrodes is a function of the angular relation of said vessel and said element.

KURT VOLKMANN.